(No Model.) 2 Sheets—Sheet 1.

M. WALKER.
BALL AND SOCKET JOINT.

No. 522,391. Patented July 3, 1894.

Witnesses
A. L. Hobbie
M. B. O'Dogherty

Inventor
Miciah Walker
By Thos. S. Sprague & Son
Attys.

(No Model.) 2 Sheets—Sheet 2.

M. WALKER.
BALL AND SOCKET JOINT.

No. 522,391. Patented July 3, 1894.

Witnesses
A. L. Kabbie
R. M. Dogherty.

Inventor
Miciah Walker
By Thos. S. Sprague & Son
Attys.

UNITED STATES PATENT OFFICE.

MICIAH WALKER, OF PORT HURON, MICHIGAN.

BALL-AND-SOCKET JOINT.

SPECIFICATION forming part of Letters Patent No. 522,391, dated July 3, 1894.

Application filed September 26, 1893. Serial No. 486,535. (No model.)

*To all whom it may concern:*

Be it known that I, MICIAH WALKER, a citizen of the United States, residing at Port Huron, in the county of St. Clair and State of Michigan, have invented certain new and useful Improvements in Ball-and-Socket Joints, of which the following is a specification, reference being had therein to the accompanying drawings.

The invention consists in the peculiar construction of a ball and socket joint, expressly designed for connecting fluid conductor pipes together, such for instance, as water pipes laid on uneven ground, as in the bed of a river.

My invention further consists in the arrangement, construction and combination of the various parts.

Figure 1:
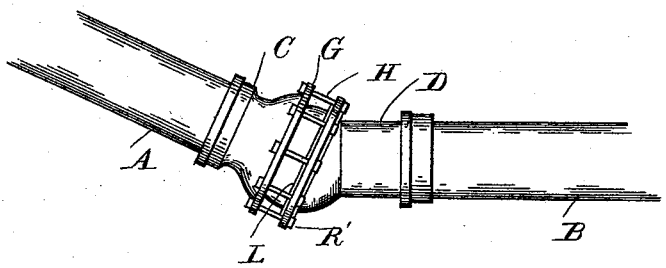
Figure 2:
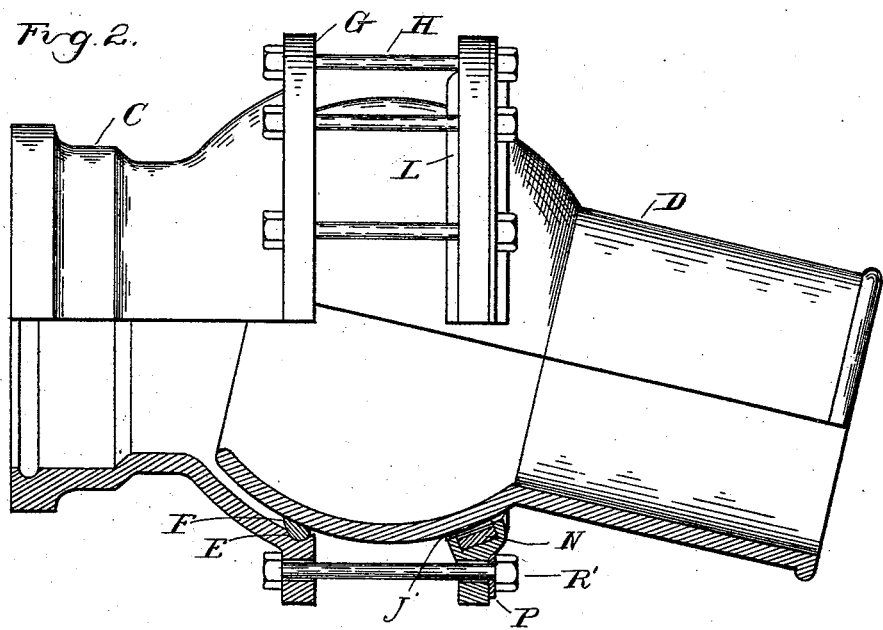
Figure 3:
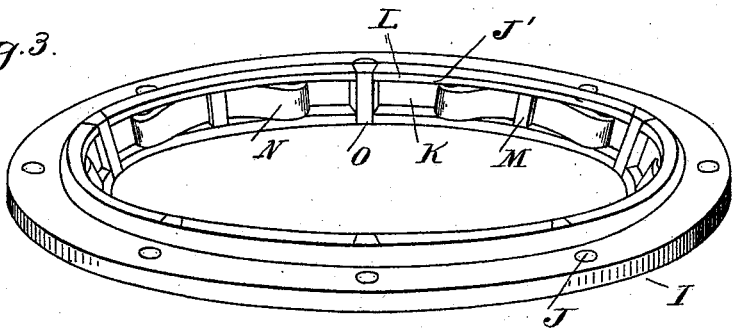
Figure 4:
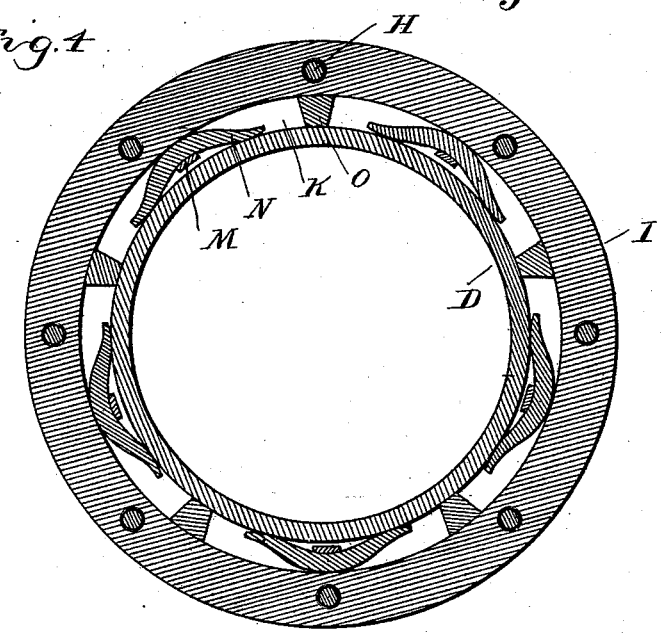
Figure 5:
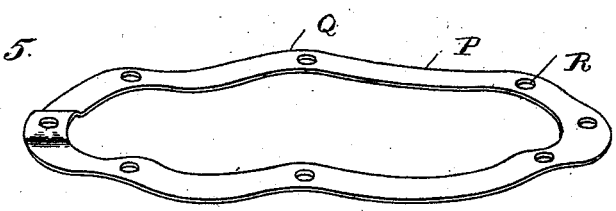

In the drawings, Figure 1 is a diagram elevation of my improved joint, showing the two parts arranged at any angle to each other. Fig. 2 is an enlarged sectional elevation thereof. Fig. 3 is a perspective view of the compression ring detached. Fig. 4 is a cross section through the joint centrally through the compression ring. Fig. 5 is a detached perspective view of the spring washer ring.

A and B represent two pipes adapted to be connected together by my joint, of which C is the socket and D the ball member, each being provided with suitable means for connection to the adjacent pipe.

The socket member is provided near its edge on its inner face with an annular groove E in which is engaged a soft gasket or packing F, preferably of lead or other similar material and against which the outer face of the ball is adapted to bear.

G is a flange collar formed on the socket member, preferably at or near the outer edge thereof and provided with suitable apertures for the bolts H which pass therethrough, the heads bearing on the outer face of the collar, as plainly shown in Fig. 2.

I is the compression ring having apertures J corresponding to the apertures in the collar G and through which the other end of the bolts H pass. This collar is of a size less than the greatest diameter of the ball, so that it will bear against the outer face thereof. The collar is provided with a tapering or beveled inner face J' corresponding substantially to the inclination of the outer bevel face of the ball. The inner face J' of the ring is provided with an annular groove K formed between the flanges L. M are cross-bars connecting the outer edges of these flanges and over which are arranged the substantially semicircular springs N, the ends of which project beyond the edges of the flanges, while the central portion thereof bears against the inner face of the groove K.

O are a series of soft metal packing strips dovetailed into the inner face of the ring and adapted to bear against the outer face of the ball.

P is a spring washer having corrugations Q and apertures R which correspond in location and number with the apertures for the bolts in the rings.

The parts being thus constructed they are assembled by first engaging the ring I upon the outer face of the ball and securing it in such position by passing the bolts H through the apertures in the ring and securing the nuts R'. These nuts will bear against the corrugations Q of the spring washers P which will act as a lock nut therefor. The pipes may now be turned at the desired angle to each other and the nuts screwed up, tightly clamping the ring upon the ball, which will force the ball against the packing F and form a tight joint. This clamping effect will compress the springs N against the outer face of the ball and these springs will be maintained under tension at all times. Now in case the joint is operated, that is the ball and socket are turned in relation to each other, the friction of the gasket F will wear the same, but such wear will be taken up by the expansion of the springs N and thereby, notwithstanding such wear will maintain a tight joint.

When the ring is drawn up to the limit of the springs N it will bear against the ball touching only however upon the cross-bars O of non-corrosive material, thus preventing the rusting of the ring in position upon the ball, which would prevent proper movement of the parts in relation to each other.

What I claim as my invention is—

1. In a flexible pipe joint, the combination with a ball member, of a socket member, a ring surrounding the ball member, a series of springs interposed between the ring and ball, and a series of adjusting bolts connecting the ring to the socket member, substantially as described.

2. In a flexible pipe joint, the combination with a ball member, of a socket member, a recessed ring surrounding the ball member, adjusting connecting bolts between the ring and socket member, and a spring secured in the recess of the ring and bearing on the ball, substantially as described.

3. In a pipe joint, the combination of the ball and socket members, of a ring surrounding the ball, semi-elliptical spring supported in the ring and having extending portions bearing against the ball and tension bolts on the socket member engaging the ring, substantially as described.

4. In a flexible pipe joint, the combination with a ball and socket member, of a separate ring surrounding the outer end of the ball, having a depression in its inner face, a series of springs fixed in the depression, a series of packing strips O in the ring, and the bolts H connecting the ring and socket, substantially as described.

In testimony whereof I affix my signature in presence of two witnesses.

MICIAH WALKER.

Witnesses:
M. B. O'DOGHERTY,
O. F. BARTHEL.